United States Patent
Andrieu et al.

(10) Patent No.: US 9,960,597 B2
(45) Date of Patent: May 1, 2018

(54) DEVICE FOR SEPARATELY TRANSMITTING MULTIPLE ELECTRIC POWERS ON A TURBOMACHINE ROTOR

(71) Applicant: RATIER FIGEAC, Figeac (FR)

(72) Inventors: Stephane Andrieu, Figeac (FR); Jean De La Bardonnie, Vindelle (FR); Bruno Seminel, Lissac-et-Mouret (FR)

(73) Assignee: RATIER FIGEAC, Figeac (FR)

( * ) Notice: Subject to any disclaimer, the term of this patent is extended or adjusted under 35 U.S.C. 154(b) by 156 days.

(21) Appl. No.: 15/106,389

(22) PCT Filed: Dec. 5, 2014

(86) PCT No.: PCT/FR2014/053191
§ 371 (c)(1),
(2) Date: Jun. 20, 2016

(87) PCT Pub. No.: WO2015/092201
PCT Pub. Date: Jun. 25, 2015

(65) Prior Publication Data
US 2016/0336748 A1 Nov. 17, 2016

(30) Foreign Application Priority Data
Dec. 20, 2013 (FR) ...................................... 13 63277

(51) Int. Cl.
*H02J 3/02* (2006.01)
*F03D 80/40* (2016.01)
*B64D 15/12* (2006.01)

(52) U.S. Cl.
CPC ................ *H02J 3/02* (2013.01); *B64D 15/12* (2013.01); *F03D 80/40* (2016.05)

(58) Field of Classification Search
CPC ............. H02J 3/02; F03D 80/40; B64D 15/12
See application file for complete search history.

(56) References Cited

U.S. PATENT DOCUMENTS

| 6,851,929 B2 | 2/2005 | Goldberg |
| 7,355,302 B2 | 4/2008 | Stonestreet, II et al. |

(Continued)

FOREIGN PATENT DOCUMENTS

| EP | 2 664 545 A1 | 11/2013 |
| WO | 99/57435 A1 | 11/1999 |

(Continued)

OTHER PUBLICATIONS

International Search Report, dated Nov. 11, 2015, from corresponding PCT application.

*Primary Examiner* — Robert Deberadinis
(74) *Attorney, Agent, or Firm* — Young & Thompson

(57) ABSTRACT

A device for supplying electricity to at least one secondary electric load (30) on-board a turbomachine rotor (12) including a main circuit for transmitting main electric power to at least one main on-board electrical load (16), includes a device (15) for rotatably and electrically connecting the stator and the rotor, and at least one secondary circuit for transmitting a secondary electric power including at least one secondary conductor (28) of the stator connected to a secondary electric power source (29) suitable for outputting a secondary power in the form of a power signal with a secondary frequency selected such as to enable selective, interference-free transmission of the secondary power via the rotary electric connection device (15), separately from the main power transmission.

20 Claims, 9 Drawing Sheets

(56) References Cited

U.S. PATENT DOCUMENTS

Figure 1:
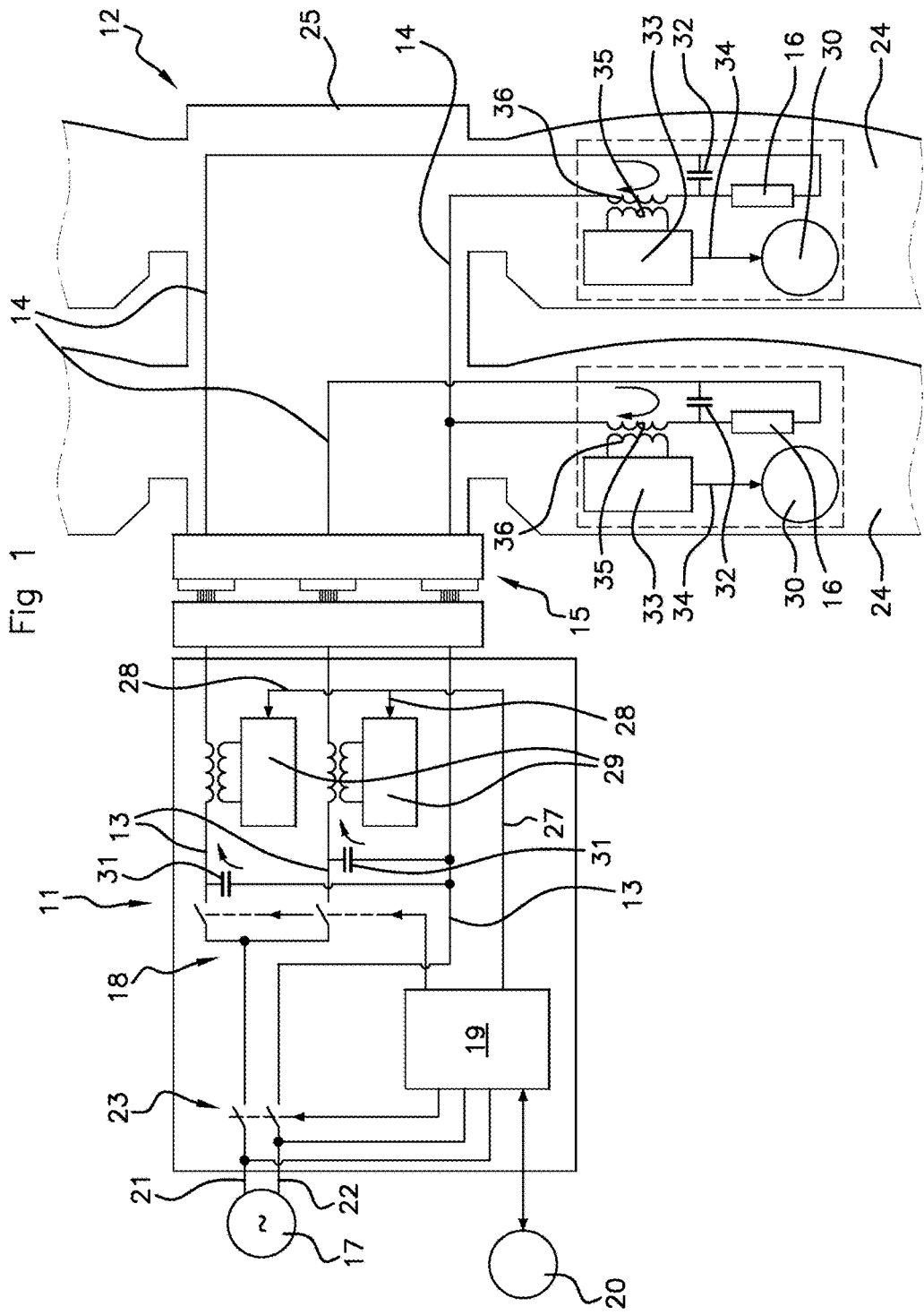

| | | |
|---|---|---|
| 7,602,081 B2 | 10/2009 | Stonestreet, II et al. |
| 8,427,074 B1 | 4/2013 | Xiong et al. |
| 2006/0013687 A1 | 1/2006 | Gaiani |
| 2006/0080010 A1 | 4/2006 | Gaiani |
| 2013/0307378 A1 | 11/2013 | Giordano et al. |

FOREIGN PATENT DOCUMENTS

| | | |
|---|---|---|
| WO | 03/102599 A1 | 12/2003 |
| WO | 03/104821 A1 | 12/2003 |

DEVICE FOR SEPARATELY TRANSMITTING MULTIPLE ELECTRIC POWERS ON A TURBOMACHINE ROTOR

The invention relates to a device for separately transmitting multiple electrical powers on a turbomachine rotor rotatably mounted relative to a stator of the turbomachine. The invention covers a turbomachine—in particular a turbomachine having a propeller/propellers such as an aircraft turboprop engine, a rotary wing of an aircraft (helicopters, gyroplanes, drones, etc.), or a wind turbine propeller; or an axial compressor or an axial turbine—equipped with a device of this type for separately transmitting multiple electrical powers, and in particular covers an aircraft comprising at least one turbomachine of this type, and covers a wind turbine comprising at least one turbomachine of this type.

Throughout the text, the expression "transmitting electrical power" means the establishment of a direct or alternating electric current at a DC or AC electrical voltage having predetermined characteristics that remain constant over time, by contrast with electrical control signals or communication signals which are, by their nature, regularly interrupted and/or have characteristics that vary over time in order to transmit information.

A turbomachine rotor comprises a rotary shaft which supports blades of a compressor (an axial or centrifugal compressor, an open or closed compressor, a compressor for compressible or incompressible fluid) and/or of a turbine (an axial or centrifugal turbine, an open or closed turbine, a turbine for compressible or incompressible fluid). The benefit of equipping a turbomachine rotor, and in particular the blades of a rotor of this type, with various electrical and/or electronic systems is already known, for example for de-icing the blades, for detecting impacts or vibrations (WO 03102599, WO 03104821, WO 9957435) or for other purposes.

One of the problems that is nevertheless present in this context is that of supplying electrical power to these different electrical loads installed on the rotor. Indeed, WO 03102599 and WO 03104821 specify the use of a cell, for example. This solution is not satisfactory and is not used in practice. This is because it places significant limitations on the performance of the installed electrical system since it does not allow a significant amount of power and/or sufficient autonomy to be provided, or requires regular, expensive maintenance operations. In addition, it is not sufficiently reliable (the operation of the cell may be affected by the large accelerations or vibrations to which a turbomachine rotor is subjected, and the operation and autonomy of the cell cannot be controlled in real time by a system that is rigidly connected to the stator). This solution also poses problems relating to integrating the cell, given its mass (causing an imbalance) and its overall dimensions.

In the case of a wind turbine, WO 9957435 recommends using, as a source of electrical power, a battery that is recharged by a charger utilising the rotation of the rotor, or solar panels, or a small turbine supported by the blades, or even the electrical power from the generator driven by the wind turbine. All these solutions have drawbacks which make them difficult to put into practice. For example, the use of a rotary collector that is specifically dedicated to supplying electrical power to an installed electrical monitoring system is theoretically possible, but in practice would be a complicated, cumbersome and very expensive solution.

In addition, turbomachines comprising a main circuit for transmitting power between a stator and a rotor, for example for supplying power to systems for electrically de-icing the blades, are known, and it has been proposed (cf. for example U.S. Pat. No. 6,851,929, U.S. Pat. No. 7,355,302, U.S. Pat. No. 7,602,081, EP 2664545) that this main power-transmission circuit be used to transmit control signals between the stator and rotor, to an installed electronic unit for controlling the de-icing system. The electrical power supply to this installed electronic unit is carried out by the main circuit, and may not be active when no power is being transmitted by the main circuit to the de-icing system, except to provide power to batteries supported by the rotor, with the same drawbacks as those mentioned above.

The invention therefore aims at overcoming all of these drawbacks by proposing a device for separately transmitting multiple electrical powers on a turbomachine rotor rotatably mounted relative to a stator of the turbomachine.

The invention also aims at proposing a device for separately transmitting multiple electrical powers on a turbomachine rotor that has a level of reliability that is compatible with the operating constraints of the turbomachine, the integration of said device in the turbomachine not significantly affecting the performance or operation of said turbomachine or its various components, and said device being low-cost in terms of installation and use.

The invention also aims at proposing a device of this type which is compatible with integration on a turbomachine, and in particular on an aircraft turbomachine. For this purpose, the invention specifically aims at proposing a device of this type which is light, compact, simple, and reliable, has a long service life, can undergo certification and is compatible with the constraints relating to integration on aircraft or wind turbines.

The invention aims in particular at proposing a device of this type that allows at least one main electrical load installed on a turbomachine rotor to be supplied with electrical power, and also allows at least one secondary electrical load installed on said rotor to be separately supplied with electrical power. The invention aims in particular at proposing an electrical power supply device of this type that allows the characteristics of the electrical power supply to each secondary installed electrical load to be adjusted depending on the specific requirements of this secondary electrical load (without limiting the performance of each secondary electrical load), and which is not limited in terms of autonomy and ensures that each secondary electrical load is supplied with electrical power separately from the electrical power supply to each main electrical load installed on the rotor.

The invention thus aims in particular at proposing a device for separately transmitting multiple electrical powers on a turbomachine rotor which allows at least one secondary installed electrical load to be supplied with electrical power separately from the electrical power supply to other installed electrical loads, such as the electrical de-icing systems (that is to say which ensures that at least one secondary installed electrical load is supplied with power even when other installed electrical loads are not being supplied with power). The invention also aims in particular at proposing a power supply device of this type which makes it possible to avoid including cells or batteries installed on the rotor, and which is therefore free of cells or batteries installed on the rotor.

The invention also aims at proposing a device of this type for separately transmitting multiple electrical powers on a turbomachine rotor which allows each secondary installed electrical load to be selectively supplied with power without disrupting other installed electrical components which are supplied with power by another power supply device.

The invention also aims in particular at proposing a device for separately transmitting multiple electrical powers on a turbomachine rotor which makes it possible to monitor at least part of a circuit for transmitting power between the stator and the rotor of the turbomachine.

The invention also aims at proposing a turbomachine having the same advantages, that is to say comprising a device for separately transmitting multiple electrical powers on the rotor of the turbomachine that has the above-mentioned advantages.

The invention also aims in particular at proposing a turbomachine of which the rotor can be equipped with at least one main installed electrical load and at least one secondary installed electrical load, the electrical power supply to which is ensured separately from the electrical power supply to each main electrical load, by a device for separately transmitting multiple electrical powers on the rotor of the turbomachine that has the above-mentioned advantages.

The invention aims more particularly at proposing an open axial-flow air turbomachine (propeller or fan of a turboprop engine or of an aircraft piston engine, a wind turbine propeller, etc.).

The invention also aims at proposing an aircraft comprising at least one turbomachine of this type. The invention also aims at proposing a wind turbine comprising at least one turbomachine of this type.

To this end, the invention relates to a device for separately transmitting multiple electrical powers on a turbomachine rotor rotatably mounted relative to a stator, comprising:
 a circuit, named the main circuit, for transmitting electrical power, comprising:
 electrical conductors, named the main conductors of the stator, which are rigidly connected to the stator and connected to at least one source of electrical power, named the main source, which is suitable for providing electrical power, named the main power,
 electrical conductors, named the main conductors of the rotor, which are rigidly connected to the rotor and connected to at least one main electrical load supported by the rotor, in order to supply said rotor with main power,
 a device for establishing a rotary electrical connection between the main conductors of the stator and the main conductors of the rotor, said device being capable of ensuring transmission of electrical power therebetween,
 at least one circuit, named the secondary circuit, for transmitting an electrical power, named the secondary power, comprising:
 at least one electrical conductor, named the secondary conductor of the stator, which is rigidly connected to the stator and connected to a source of electrical power, named the secondary source, which is separate from each main source and is capable of providing the secondary power in the form of a power signal at a predetermined frequency, named the secondary frequency, which is selected to allow selective, interference-free transmission of the secondary power on the main conductors of the stator and of the rotor and by means of the device for rotary electrical connection, separately from the transmission of main power to each main electrical load,
 at least one device, named a stator coupling device, for electrically coupling each secondary conductor of the stator to at least one main conductor of the stator, named the mixed conductor of the stator, the stator coupling device being suitable for supplying each mixed conductor of the stator with secondary power provided by each secondary conductor of the stator.

The invention thus proposes a device that allows multiple electrical powers to be separately transmitted on a turbomachine rotor via the same device for rotary electrical connection. Each electrical power that is thus transmitted on the rotor may have all the appropriate characteristics, particularly in terms of voltage and intensity. When passing through the device for rotary electrical connection, one of the electrical powers may be of the direct current type. At least one electrical power may be of the (single-phase or three-phase) alternating current type.

In this way, it is possible separately supply electrical power to multiple electrical loads supported by the rotor and/or also to permanently monitor the operation and/or the quality of an electrical circuit (or a plurality of electrical circuits) for transmitting electrical power on the rotor.

The device for rotary electrical connection may be formed by any structure known per se that makes it possible to ensure an electrical connection between two parts that rotate relative to one another. This device may be a device for electrical connection by means of rotary contacts, for example a brush collector, or a contact-free device for rotary electrical connection.

In a device according to the invention, none of the secondary sources are supported by the rotor. They are rigidly connected to the stator or to a system outside the turbomachine (for example supported by the body of an aircraft or the tower of a wind turbine). The secondary source provides the secondary power in accordance with the required characteristics, and is itself supplied with power by any power source, which may be the main source, for example an electrical network of the aircraft supporting the turbomachine, or an electrical network on the ground in the case of a wind turbine. Each source of electrical power, and in particular each secondary source, may be selected from the group consisting of the power sources, the voltage sources and the current sources. It is advantageously a stabilised power supply.

The secondary frequency is selected so as to separate the transmission of the secondary power in the main conductors from any other transmission of electrical power or of signals via said main conductors. The secondary frequency is different from the main frequency. In particular, advantageously and according to the invention, the main frequency and the secondary frequency are in a multiplicative ratio that is at least greater than 2, in particular greater than 10. Preferably, the secondary frequency is greater than the main frequency. Alternatively, however, there is nothing preventing the secondary frequency from being less than the main frequency.

In some embodiments, advantageously and according to the invention, said secondary circuit comprises:
 at least one loop filter of the stator,
 at least one loop filter of the rotor,
 said loop filters being selected and arranged to form, in the main circuit, at least one secondary-power transmission loop which comprises said device for rotary electrical connection and at least one stator coupling device, and allows said secondary power to flow.

The loop filters are adapted depending on the characteristics of the secondary power and of the electrical power that is likely to be transmitted by the main circuit separately from the secondary power.

In particular, advantageously and according to the invention, with the main power being transmitted in the main circuit at one frequency, named the main frequency, the secondary frequency is different from the main frequency. Moreover, each loop filter is a filter that is suitable for selectively transmitting the secondary power at the secondary frequency by filtering the electrical power at the main frequency.

Furthermore, advantageously and according to the invention, each stator coupling device comprises a filter that isolates each secondary source from the main power. In this way, each secondary source is protected from the main power.

Advantageously and according to the invention, each of the above-mentioned filters may be formed by an RLC-type passive filter. However, there is nothing preventing more sophisticated filters from being used, for example operational-amplifier active filters, if necessary in the form of integrated circuits, for example as regards the filters supported by the stator.

In some embodiments, advantageously and according to the invention, the secondary frequency is greater (at least two times greater) than the main frequency, each loop filter is a high-pass filter for selectively transmitting the secondary frequency, and the stator coupling device comprises a high-pass filter isolating said secondary source from the main power. Moreover, in these embodiments, advantageously and according to the invention, each loop filter is a parallel capacitor placed between two main conductors in order to form a loop in the main circuit. In fact, just one parallel capacitor is sufficient to act as the high-pass filter.

The selection of the secondary frequency is also adapted to general context of the application of the invention. Advantageously and according to the invention, the secondary frequency is greater than 10 kHz. Moreover, in general, the main frequency is less than 1 kHz, in particular in the case of an aircraft.

The device according to the invention in particular allows at least one secondary electrical load installed on the rotor to be separately supplied, via part of the main circuit, and in particular via said device for rotary electrical connection, with a secondary electrical power that is entirely separate from an electrical power which may be transmitted by the main circuit in order to supply power to at least one other electrical load that is also installed on the rotor (for example an electrical power for supplying power to de-icing systems). For this purpose, the device according to the invention is therefore a device for supplying electrical power to a plurality of electrical loads installed on the rotor separately from one another via the same device for rotary electrical connection, and in particular is a device for supplying electrical power to at least one secondary electrical load supported by the rotor.

Therefore, according to one aspect, the invention relates to a device for separately transmitting multiple electrical powers on a turbomachine rotor, further characterised in that said secondary circuit comprises:
  at least one electrical conductor, named the secondary conductor of the rotor, which is rigidly connected to the rotor,
  at least one device, named a rotor coupling device, for electrically coupling each secondary conductor of the rotor to at least one main conductor of the rotor, named the mixed conductor of the rotor, the rotor coupling device being suitable for supplying each secondary conductor of the rotor with secondary power provided by each mixed conductor of the rotor,
and in that at least one secondary conductor of the rotor is connected to at least one secondary electrical load installed on the rotor that is thus supplied with electrical power by the secondary power (provided by said secondary circuit) by means of the device for rotary electrical connection.

Therefore, the device according to the invention makes it possible to separately and selectively supply electrical power to at least one main load installed on the rotor from at least one main source via the main circuit comprising said device for rotary electrical connection, and to at least one secondary electrical load installed on the rotor from at least one secondary source that is separate from each main source via a secondary circuit that incorporates part of the main circuit, and in particular said device for rotary electrical connection, and by means of at least one rotor secondary conductor that is separate from each rotor main conductor and is connected to said main conductor by a rotor coupling device.

In some embodiments, advantageously and according to the invention, the main circuit comprises at least one switch between the main source and the main conductors of the stator, and each stator coupling device is linked to a main conductor of the stator that is directly connected to the device for rotary electrical connection, that is to say in particular without a switch between each stator coupling device and the device for rotary electrical connection. In other words, each stator coupling device is placed between said at least one switch (that is to say, any main power switch) and the device for rotary electrical connection. In this way, it is possible to transmit the secondary power even when the main power is not being transmitted, since the main source is isolated from the main conductors of the stator by a switching module in the open position.

The secondary electrical power is provided, via the secondary circuit, to each secondary installed electrical load so as to supply electrical power to this secondary installed electrical load. In particular, in some embodiments, advantageously and according to the invention, at least one secondary installed electrical load comprises an electrical power supply circuit comprising a rectifier for the secondary power in order to provide a continuous supply voltage.

Moreover, in some embodiments, advantageously and according to the invention, each secondary installed electrical load that is supplied with secondary power by said secondary circuit is only supplied with electrical power by said secondary power originating from said secondary source. Alternatively, however, there is nothing preventing the same secondary installed electrical load from being supplied with electrical power not only by said secondary power provided by a secondary circuit, but also partly by another, separate secondary circuit and/or by another electrical power supply that provides electrical power which does not pass through the device for rotary electrical connection.

According to another aspect (which may or may not be combined with the previous aspect), the invention relates to a device for separately transmitting multiple electrical powers on a turbomachine rotor, characterised in that it comprises at least one detector arranged to provide a signal that is representative of at least one parameter of an electric current flowing in the secondary circuit, in particular of the electric current flowing in said secondary-power transmission loop and/or of the electric current flowing in a stator secondary conductor and/or of the electric current provided by a secondary source, so as to allow this parameter to be monitored. The device according to the invention is therefore a device for monitoring the proper operation of the secondary circuit and/or at least part of the main circuit, and particular for monitoring the proper operation of said device for rotary electrical connection.

Advantageously and according to the invention, a detector of this type is selected from the group consisting of amperometric detectors and voltammetric detectors. Other variants are possible (frequency detector, phase detector, power detector, etc.).

In some advantageous embodiments, a device according to the invention comprises an amperometric detector that is arranged to provide a signal representative of the intensity of the electric current flowing in the secondary circuit. Advantageously and according to the invention, an amperometric detector of this type is supported by the stator and provides a signal representative of the intensity of this electric current, which signal may be transmitted to a central system in order to be processed and/or utilised, in particular for the purpose of monitoring the existence of and/or the value of and/or the change in the intensity of this electric current. A device according to the invention may comprise a single secondary circuit comprising a single source of secondary power, a single secondary conductor of the stator and a single secondary conductor of the rotor. Alternatively, a device according to the invention may comprise a plurality of secondary circuits (the different secondary circuits making it possible to supply power to different installed electrical loads separately from one another) and/or a plurality of sources of secondary power and/or a plurality of secondary conductors of the stator and/or a plurality of secondary conductors of the rotor and/or a plurality of coupling devices of the stator and/or a plurality of coupling devices of the rotor. In particular, a secondary circuit may be formed on each of the phases of the main circuit. Likewise, the same secondary circuit may supply power to a plurality of installed electrical components. Alternatively, a plurality of secondary circuits may be provided, each secondary circuit supplying power to one of the installed electrical components, respectively, the different installed electrical components thus being supplied with power separately from one another.

The devices for coupling each secondary conductor to at least one main conductor have the function of admitting the current of the secondary power into the main conductor in the region of the stator and extracting the current of the secondary power from the main conductor in the region of the rotor. Taking into account the fact that, in general, the main circuit may convey an electric current having very different characteristics from those of the current of the secondary power, it is preferable to provide inductive-coupling devices that isolate the secondary conductors and the main conductors.

Therefore, advantageously and according to the invention, each electrical-coupling device comprises an isolating transformer that forms an inductive coupling. More particularly, in the embodiments in which the device according to the invention is a device for separately supplying power to at least one secondary installed electrical load, advantageously and according to the invention:

each stator coupling device comprises a transformer, named an isolating transformer of the stator, which forms an inductive coupling between the mixed conductor of the stator and each secondary conductor of the stator, each rotor coupling device comprises a transformer, named an isolating transformer of the rotor, which forms an inductive coupling between the mixed conductor of the rotor and each secondary conductor of the rotor.

Moreover, each secondary circuit is advantageously suitable for preventing interference between the main circuit and the secondary circuit, that is to say for preventing the admission of parasitic current between the main circuit and the secondary circuit, or vice versa. To this end, advantageously and according to the invention:

each stator coupling device comprises a loop filter connected to said mixed conductor of the stator, in particular upstream of the isolating transformer of the stator, each rotor coupling device comprises a loop filter connected to said mixed conductor of the rotor, in particular downstream of the isolating transformer of the rotor, said loop filters being suitable for forming a secondary-power transmission loop in the main circuit between a stator coupling device and a rotor coupling device, so as to selectively transmit said secondary power to each secondary installed electrical load.

The device for electrically coupling the stator and the device for electrically coupling the rotor therefore make it possible to protect the stator and rotor secondary conductors, respectively, from the electrical power flowing in the main circuit. Said devices also make it possible to protect the different components connected to the main circuit from the secondary power. Advantageously and according to the invention, each rotor coupling device comprises a filter that isolates each secondary installed electrical load from the main power.

Moreover, advantageously and according to the invention, in the embodiments in which the secondary frequency is greater than the main frequency, the rotor coupling device comprises a high-pass filter that isolates each secondary installed electrical load from the main power.

On the rotor side, in order to prevent any secondary power from being admitted into the main load, it is sufficient that:

for the secondary frequency, the impedance of the parallel capacitor forming the loop filter of the rotor is less, in particular at least 10 times less, than the impedance of the main load, for the maximum value of the main frequency, the impedance of the parallel capacitor forming the loop filter of the rotor is greater, in particular at least 10 times greater, than the impedance of the main load.

On the stator side, in order to prevent any secondary power from being admitted into the main load, it is sufficient that:

for the secondary frequency, the impedance of the parallel capacitor forming the loop filter of the rotor is less, in particular at least 10 times less, than the impedance of the main source, for the maximum value of the main frequency, the impedance of the parallel capacitor forming the loop filter of the stator is greater, in particular at least 10 times greater, than the impedance of the main source.

Moreover, in some embodiments of a device according to the invention, the secondary power is lower than the main power, for example approximately 5% to 10% of the main power. Nevertheless, the invention is just as applicable when a secondary power is greater than the main power.

In some embodiments, advantageously and according to the invention, with said rotor comprising at least one blade, at least one secondary installed electrical load comprises a circuit, named a tertiary circuit, comprising:

at least one device for electrically coupling the rotor coupling device to an electrical conductor, named the tertiary conductor of the rotor, which is suitable for supplying the tertiary conductor of the rotor with electric current provided by the rotor coupling device, at least one device for electrically coupling the tertiary conductor of the rotor to an electrical loop circuit supported by a blade of the rotor, at least one device for electrically coupling said electrical loop circuit to a unit for supplying electrical power to at least one electrical load, named the tertiary electrical load, which is supported by said blade of the rotor. This tertiary electrical load is, for example, a tertiary electrical circuit supported by a blade of the turbomachine, a plurality of tertiary electrical circuits thus being supplied with power in parallel from the same secondary circuit.

Here too, these electrical-coupling devices are preferably coupling devices having an isolating transformer which produce an inductive coupling and comprise suitable loop filters.

Moreover, there is nothing preventing interlinking a plurality of power transmission circuits that are connected to one another by electrical-coupling devices, these preferably having isolating transformers that make it possible to produce an inductive coupling.

The invention also covers a turbomachine comprising a rotor rotatably mounted relative to a stator, at least one main electrical load installed on the rotor and at least one secondary electrical load installed on the rotor, characterised in that it comprises a device for separately transmitting multiple electrical powers on the rotor according to the invention.

Advantageously, a turbomachine according to the invention is also characterised in that the rotor comprises at least one propeller having a plurality of blades that are mounted for conjoint rotation with the rotor, and, as a main electrical load, a device for de-icing at least one blade of the propeller. This may in particular be an aircraft propeller (open axial-flow air compressor: a fan or propeller providing propulsion or lift (that is to say including a rotary wing)), or a wind turbine propeller (open axial air turbine).

Moreover, advantageously and according to the invention, at least one secondary installed electrical load is selected from the group of electrical transducers and electrical actuators.

An electrical transducer may in particular be a detector comprising at least one sensitive element capable of providing an electrical measurement signal, and at least one electrical circuit linked to each sensitive element in order to supply it with power and/or to process the measurement signal provided thereby. The secondary power is supplied to an electrical circuit (for supplying power and/or for processing the signal) and/or to a sensitive element of an electrical transducer of this type. As a non-limiting example, these may be electronic microsystems that are embedded in the blade and/or on the rotor shaft in order to measure a speed (or to detect when a speed has exceeded a predetermined threshold) and/or in order to detect impacts and/or to measure vibrations and/or to count the number of rotations of a propeller and/or to measure the temperature (or to detect when a temperature has exceeded a predetermined threshold) and/or to measure pressure or strain (or to detect when pressure has exceeded a predetermined threshold or when strain has exceeded a predetermined threshold), etc.

In particular, advantageously and according to the invention, at least one secondary installed electrical load comprises at least one electrical transducer comprising at least one sensitive element selected from the group consisting of accelerometers, piezoelectric sensors, vibration sensors, temperature sensors, strain gauges, pressure sensors, acoustic sensors, current sensors, voltage sensors, humidity sensors, ozone sensors, smoke sensors, ash sensors, deformation sensors, frost sensors and ice sensors. Other examples are possible.

Alternatively or in combination, advantageously and according to the invention, at least one secondary installed electrical load comprises at least one electrical actuator supplied with secondary power, for example a solenoid valve, a brake, a servo-valve, etc.

The invention also covers an aircraft comprising at least one turbomachine according to the invention. It also covers a wind turbine comprising at least one turbomachine according to the invention.

The invention also relates to a device for separately transmitting multiple electrical powers on a turbomachine rotor—in particular a device for supplying electrical power to at least one secondary electrical load installed on a turbomachine rotor, to a turbomachine, to an aircraft and to a wind turbine that are characterised in combination by all or some of the features mentioned previously or in the following.

Figure 2:
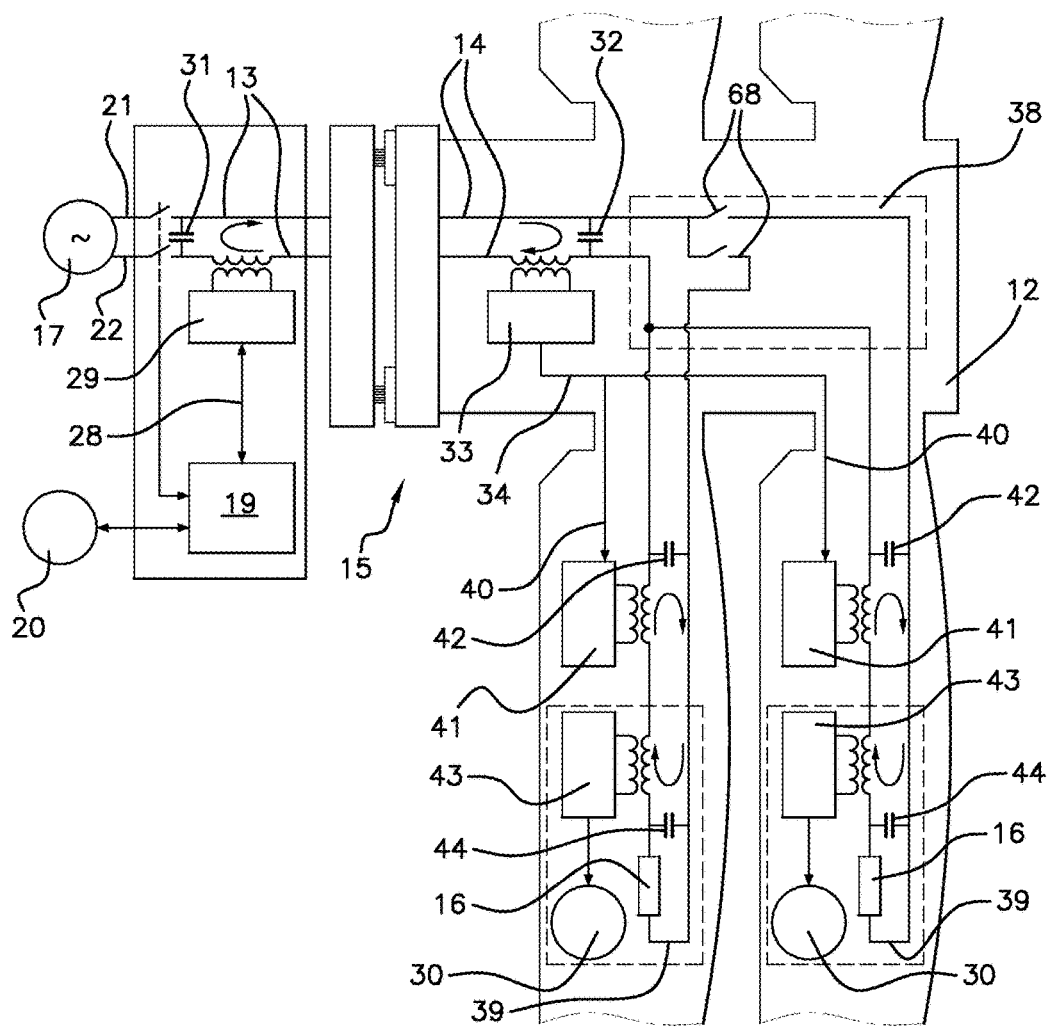
Figure 3:
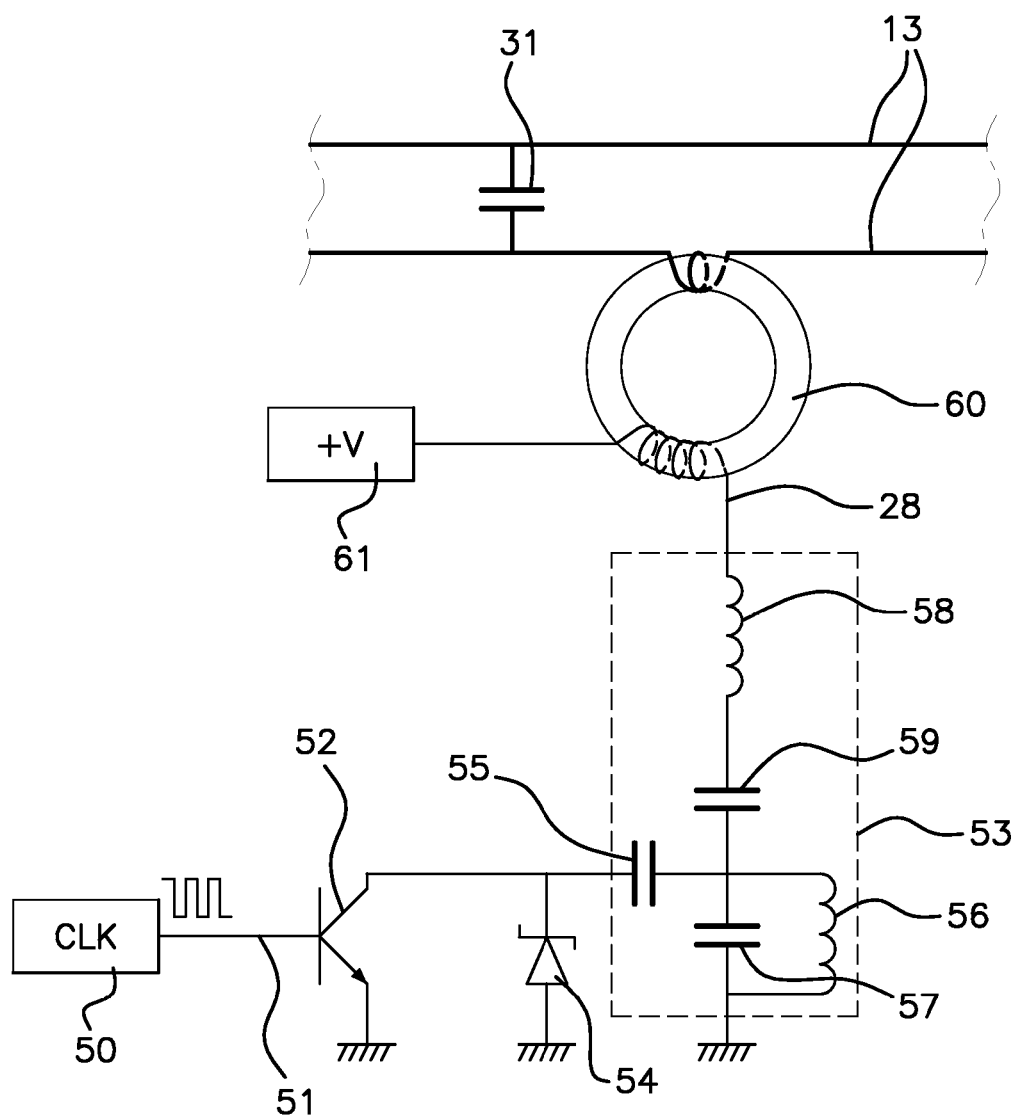
Figure 4:
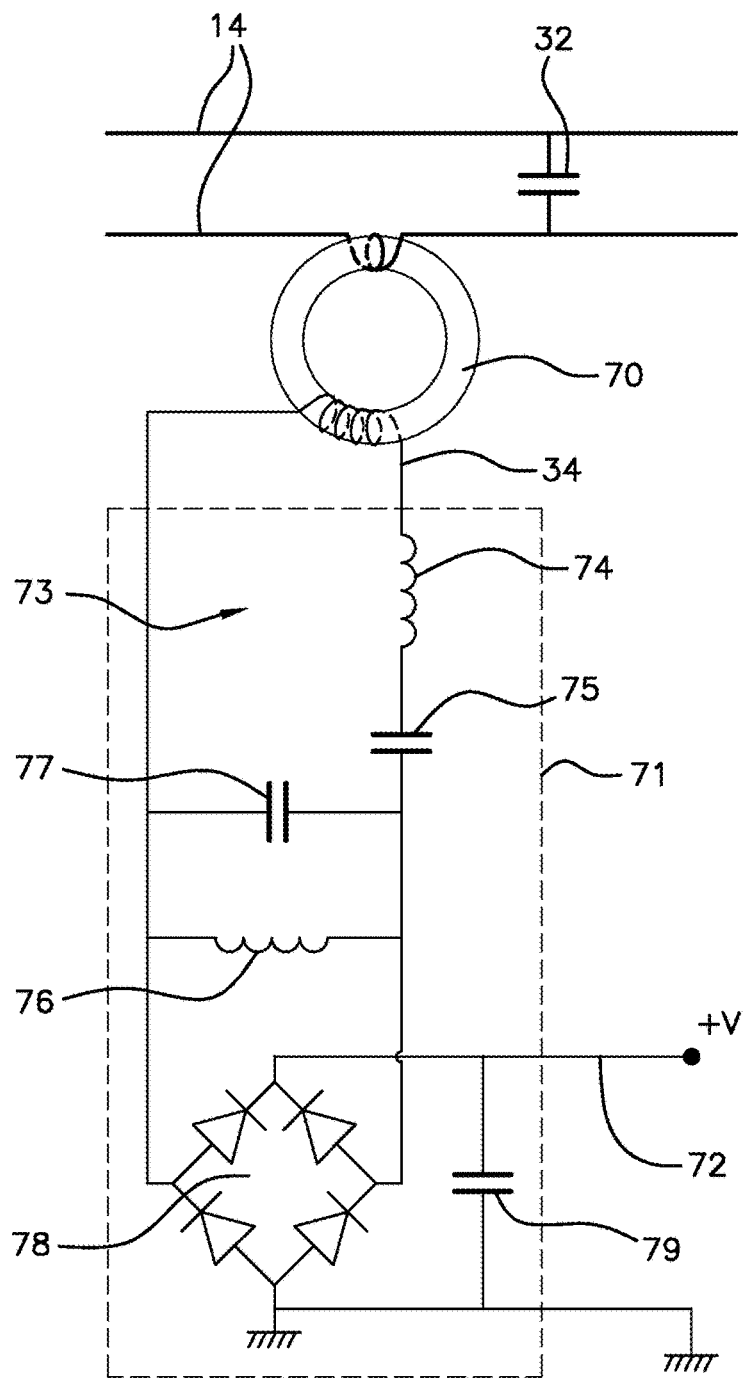
Figure 5:
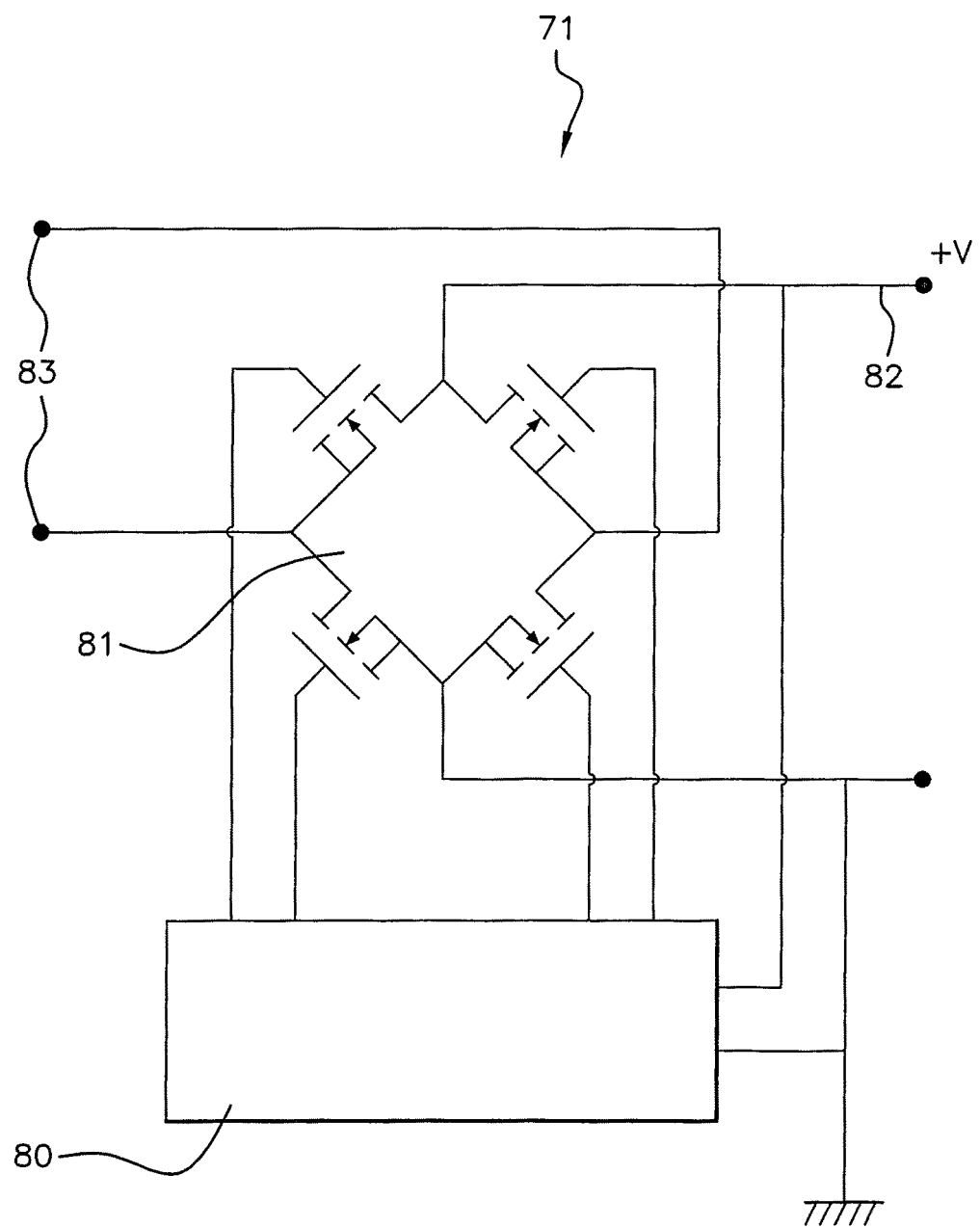
Figure 6:
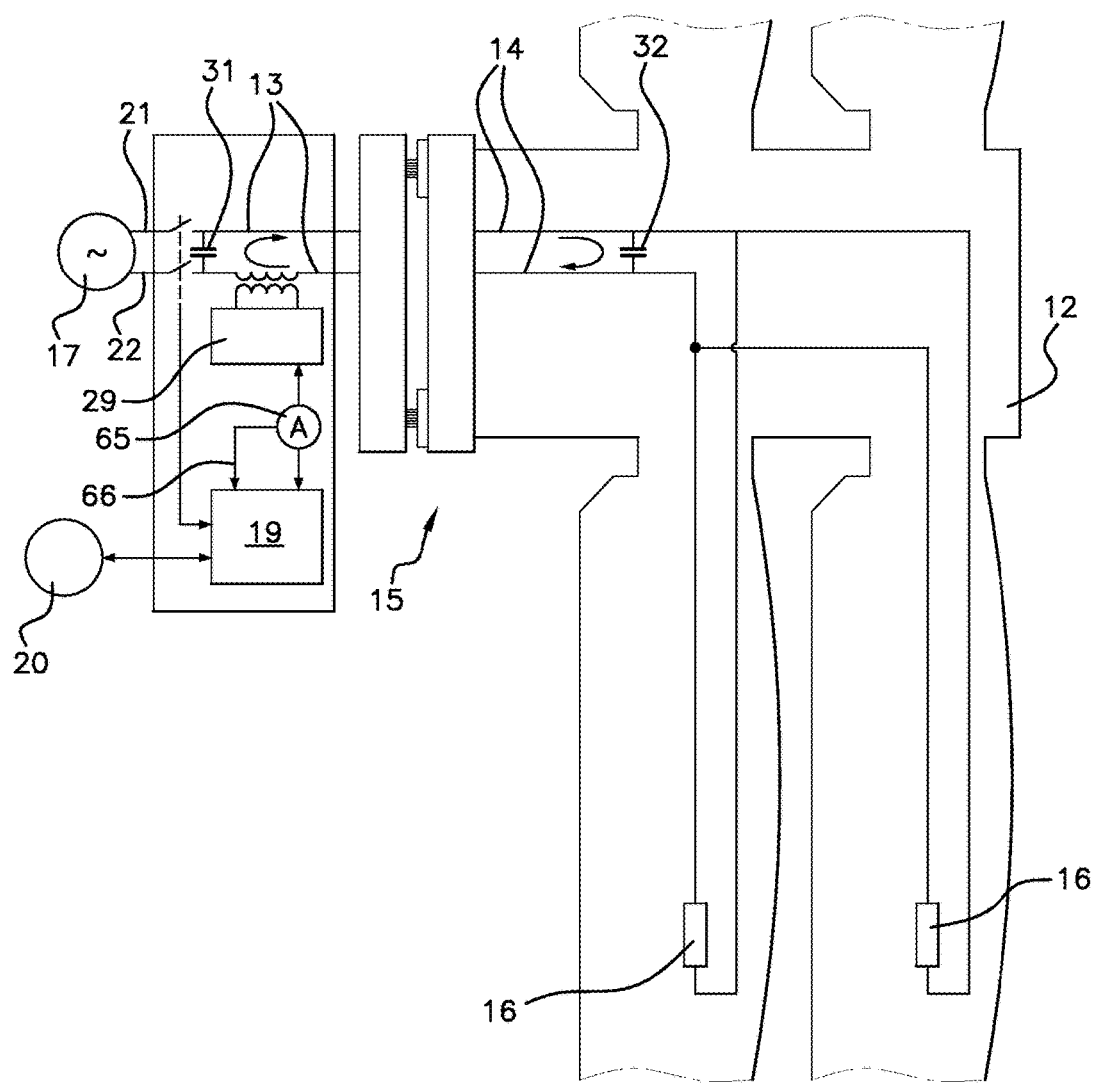
Figure 7:
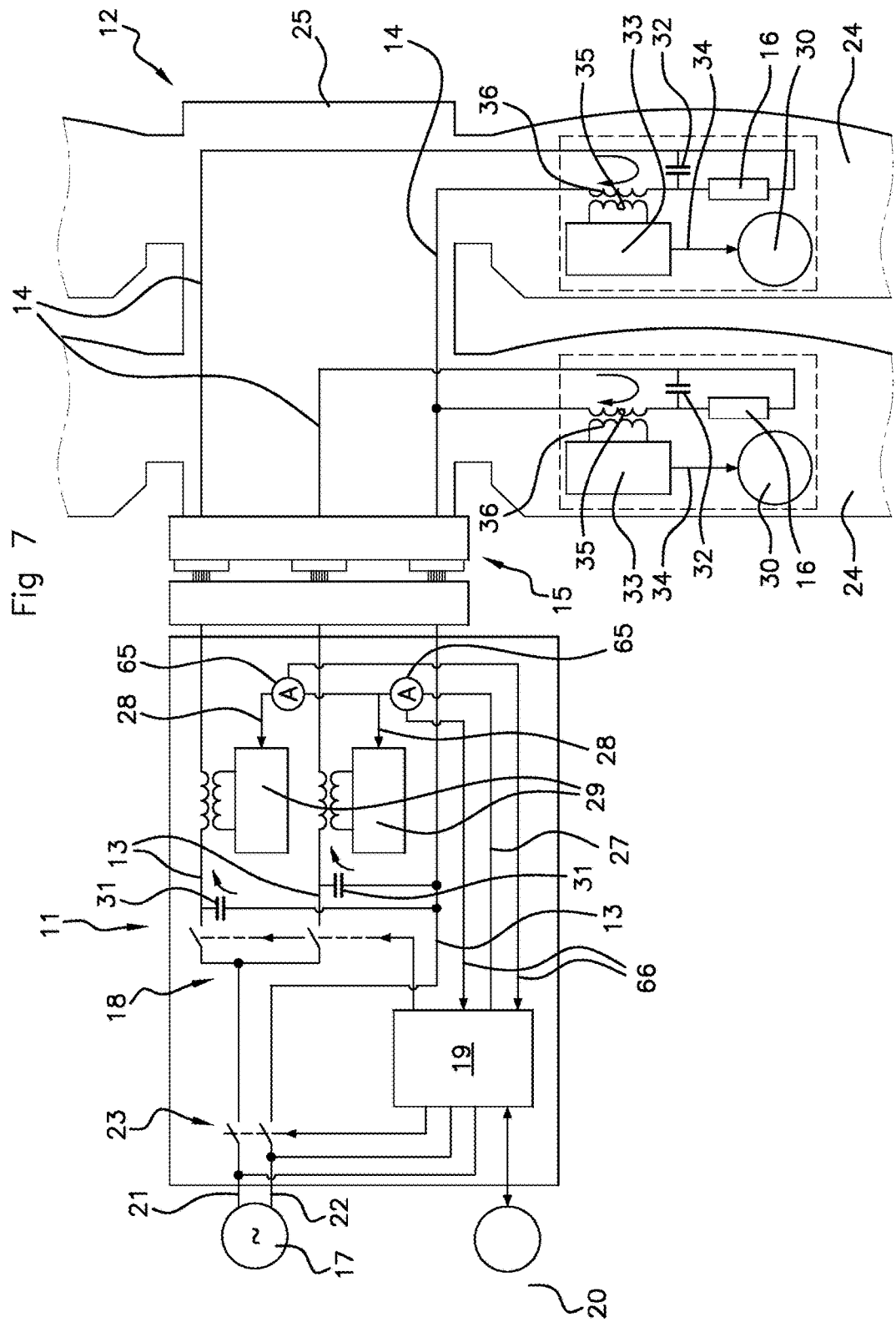
Figure 8:
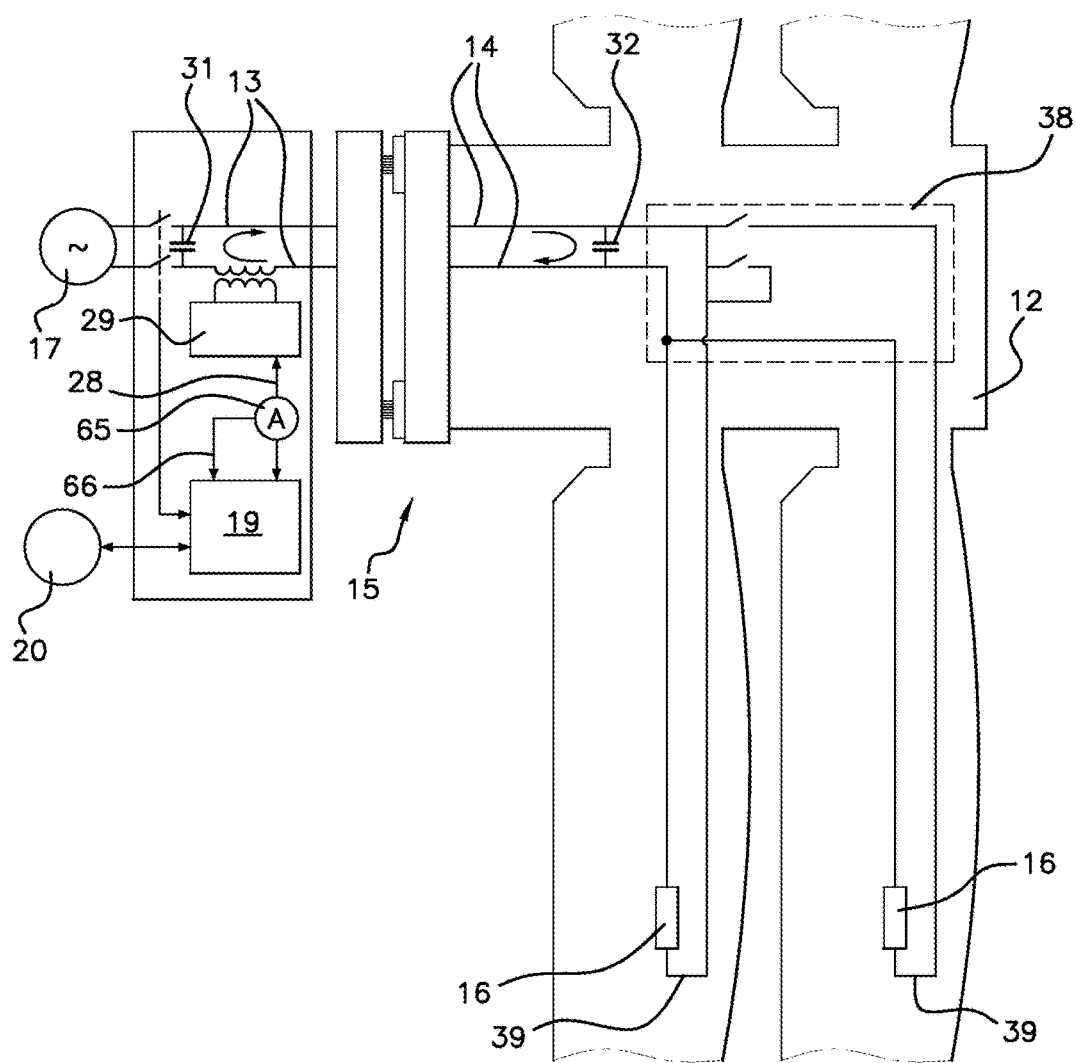
Figure 9:
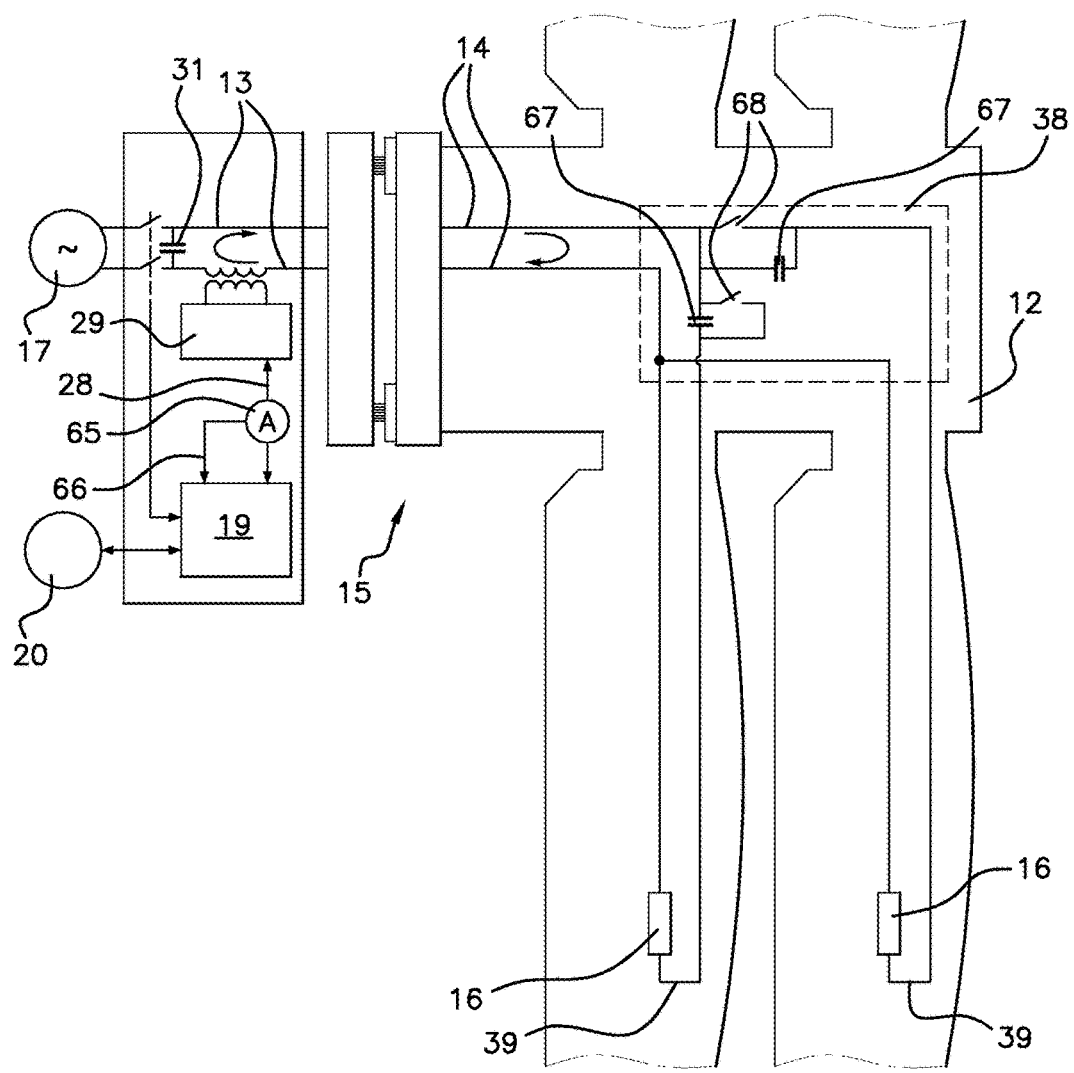

Other aims, features and advantages of the invention will emerge from reading the following description, which is given purely by way of non-limiting example and refers to the accompanying drawings, in which:

FIG. 1 is a block diagram of a turbomachine and of a first embodiment of a device according to the invention for separately transmitting multiple electrical powers on a turbomachine rotor, in which the device is a device for supplying electrical power to a plurality of installed electrical loads separately from one another, FIG. 2 is a block diagram of a turbomachine and of a second embodiment of a device according to the invention, in which the device is a device for supplying electrical power to a plurality of installed electrical loads separately from one another, FIG. 3 is a circuit diagram that illustrates in greater detail an embodiment of a stator coupling device of a device according to the invention for separately transmitting multiple electrical powers on a turbomachine rotor, FIG. 4 is a circuit diagram that illustrates in greater detail a first variant of a rotor coupling device of a device for supplying electrical power according to the invention, FIG. 5 is a circuit diagram that illustrates in greater detail a second variant of a rotor coupling device of a device for supplying electrical power according to the invention, FIG. 6 is a block diagram of a turbomachine and of a third embodiment of a device according to the invention, in which the device is a device for monitoring the proper operation of the secondary circuit and/or at least part of the main circuit, FIG. 7 is a block diagram of a turbomachine and of a fourth embodiment of a device according to the invention, in which the device is simultaneously a device for supplying electrical power to a plurality of installed electrical loads separately from one another according to FIG. 1, and a device for monitoring the proper operation of the secondary circuit and/or at least part of the main circuit, FIG. 8 is a block diagram of a turbomachine and of a fifth variant of a device according to the invention, in which the device is a device for monitoring the proper operation of the secondary circuit and/or at least part of the main circuit, FIG. 9 is a block diagram of a turbomachine and of a sixth embodiment of a device according to the invention, in which the device is a device for monitoring the proper operation of the secondary circuit and/or at least part of the main circuit.

A turbomachine comprises a stator 11 and a rotor 12 that is mounted so as to rotate relative to the stator 11. In the drawings, the general mechanical and thermodynamic features of the turbomachine are not explained in detail since the invention is applicable to any type of turbomachine in terms of these mechanical and thermodynamic features, whether it is an axial or centrifugal turbomachine, an open or closed turbomachine, a turbomachine for compressible fluid (for example air) or incompressible fluid (for example water), a compressor (including a ventilator, fan, propeller or pump) and/or a turbine, etc. In any case, the rotor 12 comprises a main shaft 25 that is rotatably guided relative to the stator 11 and at least one blade 24 that is mounted for conjoint rotation with this shaft, generally a plurality of blades that are evenly distributed around the shaft 25.

The turbomachine is equipped with a main electrical power supply circuit that makes it possible to transmit electrical power between electrical equipment that is rigidly connected to the stator and installed electrical equipment that is rigidly connected to the rotor. This main electrical power supply circuit comprises a device 15 for establishing a rotary electrical connection between electrical conductors, named the main conductors 13 of the stator, which are rigidly connected to the stator, and electrical conductors, named the main conductors 14 of the rotor, which are rigidly connected to the rotor. This device 15 for rotary electrical connection makes it possible to ensure that electrical power is transmitted between the main conductors 13, 14 while the rotor 12 is rotated relative to the stator 11. Here too, a device 15 for rotary electrical connection of this type may have different variants which are not of importance within the context of the invention insofar as it is sufficient for said device to be capable of ensuring the transmission of electrical power between the main conductors 13 of the stator and the main conductors 14 of the rotor. Said device may for example involve rotary contacts having slip rings and/or having brushes and/or having bristles (that is to say electrically conductive and resiliently flexible cylindrical fibres or filaments) and/or having axially resiliently biased studs, etc. This device 15 for rotary electrical connection is a rotary collector that has at least one channel (the current may be returned via the earth). The device 15 for rotary electrical connection may thus comprise a single channel for transmitting one phase, the current being returned via the earth, at least two channels for transmitting at least one phase and one neutral, or at least two phases with or without current return via the earth. Any configuration is possible, in particular a single-phase or three-phase configuration.

For example, the device 15 for rotary electrical connection makes it possible to transmit an electrical power, named the main power, which makes it possible to supply power to resistors 16 for electrically de-icing the rotor blades using the Joule effect.

This main power is transmitted by the main electrical power transmission circuit comprising the main conductors 13 of the stator, the main conductors 14 of the rotor, the device 15 for rotary electrical connection, a main source 17 of electrical energy which may be, for example, one of the electrical networks of the aircraft or an electrical network on the ground, and a switching module 18 controlled by a module 19 for managing the electrical power supply so as to allow each of the different main conductors 13 of the stator to be selectively supplied with main power.

In the embodiment shown in FIG. 1, the switching module 18 and the module 19 for managing the electrical power supply are supported by the stator 11. The module 19 for managing the electrical power supply is itself connected to a central system 20 for processing digital data and for control, which may be an information system on an aircraft or a wind turbine control room, or similar.

In the example shown, the main source 17 provides a single-phase alternating current on a phase 21 and a neutral 22 supplying power both to the module 19 for managing the electrical power supply and to the main conductors 13 of the stator by means of switches 23 controlled by the module 19 for managing the electrical power supply. The phase is connected in parallel to N (N=2 in the example shown) main conductors 13 of the stator, such that the main circuit comprises N+1 main conductors 13 of the stator and N+1 main conductors 14 of the rotor, the device 15 for rotary electrical connection allowing the electrical connection on N+1 channels: N phases respectively connected to N de-icing resistors 16, and one neutral. Each main conductor 14 of the rotor forming one phase is connected in series to a terminal of one of the de-icing resistors 16, the other terminal of the de-icing resistor 16 being connected to the main conductor 14 forming the neutral. Typically, each blade 24 of the rotor 12 comprises one of the de-icing resistors 16, and the module 19 for managing the electrical power supply is suitable for handling the cyclical power supply to the various resistors 16 of the various blades 24 in a manner that is suitable and known per se.

The module 19 for managing the electrical power supply also forms a source, named the secondary source, of electrical power, named the secondary power, which is suitable for supplying electrical power to M electrical components 30 installed on the rotor 12 and constituting secondary installed electrical loads. The secondary power is different from the main power since the installed electrical components 30 are different from the de-icing resistors constituting the main load supplied with main power. This secondary power is provided by the module 19 for managing the electrical power supply on a conductor, named the secondary-power supply conductor 27, which is connected to M secondary conductors 28 of the stator, which are connected in parallel to said secondary-power supply conductor 27. In the example shown in FIG. 1, M=N=2, but it is understood that the number M of installed electrical components 30 may be different from the number N of systems supplied with main power, these two numbers generally being different from 2 and possibly corresponding, or not corresponding, to the number of blades 24 of the rotor.

Each secondary conductor 28 of the stator supplies power to one winding of M isolating transformers 29 of the stator, the two terminals of this winding being connected to the module 19 for managing the electrical power supply. Another winding of each isolating transformer 29 of the stator is formed by one of the main conductors 13 of the stator. The two windings of each isolating transformer 29 of the stator are electromagnetically inductively coupled, such that the secondary power provided by the secondary conductor 28 of the stator is transmitted to the winding of the transformer 29 formed by a main conductor 13 of the stator.

Each isolating transformer 29 of the stator therefore produces an electrical inductive coupling between a secondary conductor 28 providing the secondary power and one of the main conductors 13 of the stator, in order to admit said secondary power into said main conductor 13 of the stator, which thus constitutes a mixed conductor of the stator that allows both the main power and the secondary power to be transmitted. However, each isolating transformer 29 of the stator makes it possible to also isolate the main circuit from each secondary circuit thus formed. Each isolating transformer 29 of the stator is arranged downstream of the switching module 18, that is it say it is linked to a main conductor 13 of the stator which is directly connected to the device 15 for rotary electrical connection without a switch being placed therebetween. In this way, the secondary power is transmitted to this device 15 for rotary electrical connection irrespective of the position of the switches of the switching module 18 that handles the main power.

Moreover, the switching module 18 and the main source are isolated from the secondary power by M loop filters 31 of the stator, each loop filter 31 being connected to one of the mixed conductors 13 of the stator. In the embodiment in FIG. 1, each loop filter 31 is formed by a parallel capacitor placed between the mixed conductor 13 of the stator and the neutral 22.

The secondary power admitted into the main circuit is transmitted by the device 15 for rotary electrical connection to M main conductors 14 of the rotor, named mixed conductors of the rotor, corresponding to M mixed conductors 13 of the stator.

Each de-icing resistor 16 that is connected to a mixed conductor 14 of the rotor is isolated from the secondary power by a loop filter 32 of the rotor which, in the example shown, is a parallel capacitor connected to the two terminals of the resistor 16. One of the mixed conductors 14 of the rotor connected to the resistor 16 (namely the conductor that is connected to the neutral in the example shown) forms a winding 35 of an isolating transformer 33 of the rotor. Another winding 36 of the isolating transformer 33 of the rotor is connected to conductors, named secondary conductors 34 of the rotor, which are in turn connected to one of the M installed electrical components 30. The windings 35, 36 of the isolating transformer 33 are electromagnetically inductively coupled such that the secondary power flowing in the winding 35 is transmitted into the winding 36 and makes it possible to supply an installed electrical component 30 (which constitutes a secondary installed electrical load) with secondary electrical power originating from the module 19 for managing the electrical power supply, via the device 15 for rotary electrical connection but separately from the main electrical power transmitted via said device 15 for rotary electrical connection to supply power to the de-icing resistors 16 (which constitute main electrical loads).

It should be noted that if, in the example shown, the same number of isolating transformers 29, 33 are provided as there are installed electrical components 30 (namely one per blade), there is, however, nothing preventing a single isolating transformer 33 of the stator and a single isolating transformer 29 of the rotor being provided, with the secondary power being distributed in the region of the different installed electrical components 30 and, if necessary, of the different blades, by a single secondary circuit suitable for this purpose. In practice, the number of isolating transformers 33 of the rotor is preferably selected depending on the different secondary powers required for the different installed electrical components 30 of the rotor 12. Therefore, if all the installed electrical components 30 of the rotor 12 require an electrical power supply of the same type, a single isolating transformer 33 of the rotor is sufficient. If, however, electrical power supplies of different types are required, it may be advantageous to provide as many secondary circuits and as many isolating transformers 33 of the rotor as there are electrical power supply characteristics to be provided. In this last-mentioned situation, the module 19 for managing the electrical power supply supplies power to the different isolating transformers 29 of the stator separately from one another, contrary to what is provided in the example shown.

The second embodiment shown in FIG. 2 differs from the preceding embodiment in that the device 15 for rotary electrical connection only has two channels, for the transmission of the phase and of the neutral, the main power being switched between the different de-icing systems 16 by a switching module 38 installed on the rotor 12. This switching module 38 is controlled by control signals that may be transmitted on the main conductors 13, 14 by carrier currents or by modulation, in a manner that is well known per se. The switching module 38 selectively supplies power to a plurality of N loops 39 for supplying electrical power to de-icing resistors 16. This switching module 38 comprises, for each electrical power supply loop 39, that is to say for each de-icing resistor 16, a switch 68 allowing this electrical power supply loop 39, and the corresponding de-icing resistor 16, to be selectively supplied with main power.

A single isolating transformer 29 of the stator is supplied with power by the module 19 for managing the electrical power supply. A loop filter 31 of the stator is placed between this isolating transformer 29 of the stator and the switches 23 of the phase and of the neutral that are controlled by the module 19 for managing the electrical power supply. In the example shown, this loop filter 31 of the stator is a parallel capacitor that is connected between the two main conductors 13 of the stator, that is to say between the phase and the neutral. The isolating transformer 29 of the stator is linked to one of the main conductors 13 of the stator, namely to the neutral 22 in the example shown, which forms one of its windings, another winding of this isolating transformer 29 of the stator being supplied with power by stator secondary conductors 28 connected to the module 19 for managing the electrical power supply.

A single isolating transformer 33 of the rotor is linked to one of the main conductors 14 of the rotor, namely to the main conductor 14 of the rotor which receives the neutral in the example shown, which forms one of the windings of this isolating transformer 33 of the rotor. This isolating transformer 33 of the rotor is placed between the device 15 for rotary electrical connection and the switching module 38 of the rotor, by means of a loop filter 32 of the rotor that is placed between said isolating transformer 33 of the rotor and the switching module 38 of the rotor. In the example shown, this loop filter 32 of the rotor is a parallel capacitor connected between the two main conductors 14 of the rotor, that is to say between the phase and the neutral. Another winding of the isolating transformer 33 of the rotor is connected to a rotor secondary conductor 34, so as to supply this rotor secondary conductor 34 with secondary power.

The secondary conductor 34 of the rotor makes it possible to supply power in parallel to M electrical components 30 installed on the rotor 12. Each secondary installed electrical load comprises a tertiary circuit comprising a tertiary conductor 40 of the rotor connected to the secondary conductor 34 and to a winding of an isolating transformer 41 of the blade root. Another winding of this isolating transformer 41 of the blade root is formed by one of the conductors of one of the loops 39 connected to the switching module 38. A loop filter 42 is placed between this isolating transformer 41 of the blade root and the switching module 38. In the example shown, this loop filter 42 is a parallel capacitor placed between the two conductors of the loop 39 that are connected to the two terminals of the same de-icing resistor 16.

Close to the installed electrical component 30 to be supplied with power (constituting a tertiary electrical load supported by each blade of the rotor), an isolating transformer 43, named an isolating and power supply transformer 43, is also linked to the loop 39 that supplies power to the resistor 16, one of the conductors of which forms a winding of this isolating and power supply transformer 43. Another winding of this isolating and power supply transformer 43 is connected to the installed electrical component 30 in order to supply it with secondary electrical power via the device 15 for rotary electrical connection, the isolating transformer 33 of the rotor, the isolating transformer 41 of the blade root and the isolating and power supply transformer 43. A loop filter 44 is placed between the de-icing resistor 16 and the isolating and power supply transformer 43. In the example shown, this loop filter 44 is a parallel capacitor connecting the two terminals of the de-icing resistor 16.

FIG. 3 is an exemplary circuit diagram of the module 19 for managing the electrical power supply (incorporating the secondary source) and of the isolating transformer 29 of the stator for admitting the secondary power into the main circuit. A clock 50 provides a clock signal 51 at a predetermined frequency corresponding to the secondary frequency of the secondary power. This clock signal 51 is provided at the base of an NPN transistor 52, the emitter of which is earthed and the collector of which is connected to a bandpass filter 53 by means of a parallel Zener diode 54 that protects the transistor 52 from parasitic voltage pulses which may originate from the main circuit.

The bandpass filter 53 makes it possible to transmit the power at the secondary frequency by eliminating both the high harmonics generated by the switching mode and the low-frequency components that may originate in particular from the main circuit, and the continuous components that are likely to saturate the isolating transformer 29. The output of the bandpass filter 53 (output of the LC series filter) forms a stator secondary conductor 28 that is wound around a toroidal armature 60 to form a winding having a plurality of turns. The winding thus formed has an opposing terminal that is connected to a source 61 of continuous voltage +V. The bandpass filter 53 comprises, in the example shown, a series capacitor 55 that filters the continuous components, a parallel LC filter comprising an inductor 56 and a capacitor 57, a series LC filter comprising an inductor 58 (which is added to the inductance of the winding formed by the stator secondary conductor 28) and a capacitor 59.

The stator main conductor 13 is wound around the toroidal armature 60 by one turn (or a plurality of turns). In general, the number of turns of the winding formed by this stator main conductor 13, which is of a greater diameter, is less than the number of turns of the winding formed by the stator secondary conductor 28.

The secondary frequency determined by the clock signal 51 is selected to allow the secondary power to be transmitted on the main circuit without interference and separately from the main power. In particular, it should be noted that the secondary power is transmitted by the main circuit via the device 15 for rotary electrical connection even when the main power is not being transmitted, that is to say when the switches 23 are open, for example. The secondary power is, however, also transmitted by the main circuit at the same time as the main power. The electrical networks on board an aircraft provide a main power that is generally at a frequency of less than 1 kHz, and which is typically at most equal to 650 Hz. Likewise, the electrical networks on the ground generally provide an alternating current at a frequency of less than 100 Hz. The secondary frequency therefore has to be high enough to be distinguished from the main frequency, and is preferably greater than 10 kHz, for example is selected to be between 100 kHz and 500 kHz. It is also advantageously selected so as to allow other signals, such as control signals or measurement signals, to be transmitted at different frequencies on the same main circuit, for example by carrier currents.

FIG. 4 is an exemplary circuit diagram of the isolating transformer 33 of the rotor and of an electrical power supply circuit which is part of the installed electrical component 30 that makes it possible to extract a continuous supply voltage +V from the secondary power. The rotor main conductor 14 is wound by one or more turns around a toroidal armature 70 of the isolating transformer 33 of the rotor. The rotor secondary conductor 34 is wound by a plurality of turns around said toroidal armature 70, and the two terminals of the winding thus formed are connected to two input terminals of an electrical power supply circuit 71 that comprises a bandpass filter 73 which, in the example shown, is formed by a series LC filter comprising a series inductor 74 and a series capacitor 75, and by a parallel LC filter comprising a parallel inductor 76 and a parallel capacitor 77. This bandpass filter 73 makes it possible to eliminate the low-frequency components of the main power and the very high-frequency components transmitted in the main circuit, for example for transmitting control signals or measurement signals. It is suitable for selectively transmitting the secondary frequency of the secondary power.

The two output terminals of this bandpass filter 73 are connected to a rectifier diode bridge 78, the two outputs of which form the output terminals of the electrical power supply circuit 71, by means of a parallel capacitor 79 that filters the non-continuous components. One of the output terminals is earthed, while the other output terminal 72 provides the continuous voltage +V for supplying power to the installed electrical component 30. Preferably the rectifier bridge diodes 78 are selected to have the best possible efficiency, for example Schottky diodes having a very low threshold.

FIG. 5 shows another embodiment of the electrical power supply circuit 71. In this embodiment, the circuit comprises a controller 80, for example LT®4321 (cf. www.linear.com) linked to a bridge 81 formed by MOSFET N-channel field-effect transistors with low losses, which may be PSMN075-100MSE transistors (cf. www.nxp.com). At its two inputs 83, the bridge 81 directly receives the two terminals of the winding formed by the rotor secondary conductor 34, and provides the continuous voltage on its output terminal 82.

The parallel capacitors 31, 32 forming the loop filters of the stator and of the rotor and the components of the different filters are adapted depending on the value of the secondary frequency fs. The table below gives examples of selections of the value C1 of the parallel capacitors 31, 32, the impedance of which advantageously has to be approximately 1Ω at the secondary frequency and greater than 200Ω for the frequency fp of the main power.

| | C1 (µF) | | | | | | | | |
|---|---|---|---|---|---|---|---|---|---|
| | 0.47 | 0.66 | 1 | 0.47 | 0.66 | 1 | 0.47 | 0.66 | 1 |
| fp (Hz) | 620 | 620 | 620 | 620 | 620 | 620 | 620 | 620 | 620 |
| Ω (fp) | 540 | 380 | 250 | 540 | 380 | 250 | 540 | 380 | 250 |

-continued

| C1 (μF) | | | | | | | | |
|---|---|---|---|---|---|---|---|---|
| 0.47 | 0.66 | 1 | 0.47 | 0.66 | 1 | 0.47 | 0.66 | 1 |

| | | | | | | | | | |
|---|---|---|---|---|---|---|---|---|---|
| fs (kHz) | 200 | 200 | 200 | 135 | 135 | 135 | 100 | 100 | 100 |
| Ω (fs) | 1.7 | 1.2 | 0.8 | 2.5 | 1.8 | 1.2 | 3.4 | 2.4 | 1.6 |

Moreover, for a secondary frequency of approximately 110 kHz, a value of approximately 47 nF may for example be selected for the capacitors 57 and 59 of the bandpass filter 53, and a value of approximately 47 μH may for example be selected for the series inductor 58 (including the inductance of the winding formed by the secondary conductor 28) and for the parallel inductor 56 of the bandpass filter 53. The same values may be used for the bandpass filter 73 of the power supply circuit of the installed electrical component 30.

In a variant of the invention, it is possible to use a sinusoidal signal at the secondary frequency instead of just the clock signal 51, in order to improve the power transfer and to reduce parasitic emissions.

The installed electrical components 30 which may be supplied with secondary power by a device according to the invention may be of any type and may advantageously be selected from the group of electrical transducers and electrical actuators. In particular, they may be electrical detectors comprising at least one sensitive element selected from the group consisting of accelerometers, piezoelectric sensors, vibration sensors, temperature sensors, strain gauges, pressure sensors, acoustic sensors, current sensors, voltage sensors, humidity sensors, ozone sensors, smoke sensors, ash sensors, deformation sensors, frost sensors and ice sensors. Other examples are possible. Alternatively or in combination, advantageously and according to the invention, at least one secondary installed electrical load comprises at least one electrical actuator supplied with secondary power, for example a solenoid valve, a brake, a servo-valve, etc.

It should be noted that the secondary circuit may also be suitable for transmitting signals—in particular control signals and/or communication signals and/or measurement signals—between the stator and the rotor, in one direction or the other. In particular, it may be suitable for transmitting measurement signals provided by installed detectors—in particular electrical detectors of the installed electrical components 30 that are supplied with secondary power by the secondary circuit—to the central information system 20 in order to be utilised. To this end, these signals may for example be transmitted by modulation of the secondary power, which is therefore used as a carrier. For example, these signals may be transmitted by frequency modulation relative to the secondary frequency fs. Alternatively or in combination, there is nothing preventing phase modulation and/or amplitude modulation being provided.

In the third embodiment in FIG. 6, the device according to the invention is similar to the second embodiment in FIG. 2 in terms of the multiple power transmission on the rotor, but is merely a device for monitoring the proper operation of the part of the main circuit comprising the device 15 for rotary electrical connection. To this end, an ammeter 65 is placed in series on the stator secondary conductor 28, and provides a measurement signal 66 of the electric current flowing in this stator secondary conductor 28, which signal is transmitted to the module 19 for managing the power supply and then to the central system 20 in order to be processed and utilised. The central system 20 may in particular be suitable for monitoring whether the intensity of the electric current passing through the stator secondary conductor 28 is greater than a predetermined threshold value, making it possible to detect potential anomalies in the electrical contacts established by means of the device 15 for rotary electrical connection. Here too, the loop filters 31, 32 and the bandpass filter 53 are suitable for preventing main power from being admitted towards the secondary source and for preventing any secondary power from being admitted towards the de-icing resistors 16 and the main source 17.

The fourth embodiment shown in FIG. 7 is similar to the first embodiment in FIG. 1, and only differs therefrom in that it is not only a device for supplying electrical power to a plurality of distinct electrical loads separately from one another, but also a device for monitoring the proper operation of the part of the main circuit comprising the device 15 for rotary electrical connection, and of each secondary circuit for supplying the secondary loads 30 with power. To this end, an ammeter 65 is placed in series on each stator secondary conductor 28, which supply power to a winding of an isolating transformer 29 of the stator. Each ammeter 65 provides a signal 66 representing the intensity of the current flowing in the secondary conductor 28 of the corresponding stator to the module 19 for managing the power supply. Each ammeter 65 makes it possible to detect potential anomalies not only in the electrical contacts established by means of the device 15 for rotary electrical connection, but also potentially in the corresponding secondary power supply circuit. Alternatively (not shown) or in combination, there is nothing preventing an ammeter being provided that is placed in series in the secondary-power supply conductor 27 and is connected to the different secondary conductors 28 of the stator, in order to monitor the entire electric current corresponding to the entire secondary power provided on the rotor.

The fifth embodiment shown in FIG. 8 is similar to the third embodiment in FIG. 6, with the exception that the rotor 12 comprises an installed switching module 38 as in the second embodiment in FIG. 2. This switching module 38 is controlled by control signals which may be transmitted on the main conductors 13, 14 by carrier currents or by modulation, in a manner that is well known per se. The switching module 38 selectively supplies power to a plurality of N loops 39 for supplying electrical power to de-icing resistors 16. In this embodiment, the loop filters 31, 32 are suitable for preventing any secondary power from being admitted into the loops 39 for supplying electrical power to the de-icing resistors 16, but need to allow the main power and control signals to be transmitted to the switching module 38. If necessary, filters which are more complex than simple capacitors may be provided to separate these powers and signals in terms of frequency in a suitable manner. In this fifth embodiment, the device according to the invention also comprises an ammeter 65 placed in series on the secondary conductor 28 of the stator, providing a signal 66 that is representative of the intensity of the current flowing in this secondary circuit 28 of the stator. The secondary power only flows in the loop defined by the two loop filters 31, 32, such that the device according to the invention is solely a device for monitoring the proper operation of the device 15 for rotary electrical connection.

The sixth embodiment shown in FIG. 9 differs from the fifth embodiment shown in FIG. 8 in that capacitors 67 are connected in parallel between the terminals of each switch 68 of the installed switching module 38, which selectively allows the secondary power to flow in each of the loops 39 for supplying electrical power to the de-icing resistors 16, even when these switches are open, the ammeter 65 of the stator making it possible to permanently monitor the electrical continuity in all of the different de-icing circuits (including the device 15 for rotary electrical connection). These capacitors 67 are selected to not transmit the main power, and they replace the loop filter 32 of the rotor in the fifth embodiment and the second embodiment.

The invention may have numerous variants compared with just the examples shown in the drawings and described above. In particular, the coupling devices may be implemented in a manner other than by the isolating transformers (for example by means of coupling capacitors), the isolating transformers may be implemented in a manner other than by toroidal transformers, the characteristics of each secondary source or of each module 19 for managing the power supply may vary, etc. Moreover, the main power is not necessarily a power that is intended to be supplied to de-icing systems, the invention covering other uses or applications in which two electrical powers having distinct characteristics need to be transmitted between a stator and a rotor of a turbomachine.

The invention claimed is:

1. A device for separately transmitting multiple electrical powers on a turbomachine rotor rotatably mounted relative to a stator, comprising:
    a circuit, named the main circuit, for transmitting electrical power, comprising:
    electrical conductors, named the main conductors (13) of the stator, which are rigidly connected to the stator and connected to at least one source of electrical power, named the main source, which is suitable for providing electrical power, named the main power,
    electrical conductors, named the main conductors (14) of the rotor, which are rigidly connected to the rotor and connected to at least one main electrical load (16) supported by the rotor in order to supply said rotor with main power,
    a device (15) for establishing a rotary electrical connection between the main conductors of the stator and the main conductors of the rotor, said device being capable of ensuring transmission of electrical power therebetween,
    at least one circuit, named the secondary circuit, for transmitting electrical power, named the secondary power, comprising:
    at least one electrical conductor, named the secondary conductor (28) of the stator, which is rigidly connected to the stator and connected to a source of electrical power, named the secondary source, which is separate from each main source and is capable of providing the secondary power in the form of a power signal at a predetermined frequency, named the secondary frequency, which is selected to allow selective, interference-free transmission of the secondary power on the main conductors of the stator and of the rotor and by means of the device (15) for rotary electrical connection, separately from the transmission of main power to each main electrical load,
    at least one device, named a stator coupling device, for electrically coupling each secondary conductor (28) of the stator to at least one main conductor of the stator, named the mixed conductor of the stator, the stator coupling device being suitable for supplying each mixed conductor of the stator with secondary power provided by each secondary conductor (28) of the stator.

2. A device according to claim 1, wherein said secondary circuit comprises:
    at least one loop filter (31) of the stator,
    at least one loop filter (32) of the rotor,
    said loop filters being selected and arranged to form, in the main circuit, at least one secondary-power transmission loop that comprises said device (15) for rotary electrical connection and at least one stator coupling device and allows said secondary power to flow.

3. A device according to claim 2, wherein, with the main power being transmitted in the main circuit at one frequency, named the main frequency, the secondary frequency is different from the main frequency, and in that each loop filter (31, 32) is a filter that is suitable for selectively transmitting the secondary power at the secondary frequency by filtering the electrical power at the main frequency.

4. A device according to claim 3, wherein each stator coupling device comprises a filter that isolates each secondary source from the main power.

5. A device according to claim 2, wherein each stator coupling device comprises a filter that isolates each secondary source from the main power.

6. A device according to claim 2, wherein said secondary circuit comprises:
    at least one electrical conductor, named the secondary conductor (34) of the rotor, which is rigidly connected to the rotor,
    at least one device, named a rotor coupling device, for electrically coupling each secondary conductor (34) of the rotor to at least one main conductor of the rotor, named the mixed conductor of the rotor, the rotor coupling device being suitable for selectively supplying each secondary conductor (34) of the rotor with secondary power provided by each mixed conductor of the rotor,
    at least one secondary conductor (34) of the rotor being connected to at least one secondary installed electrical load that is thus supplied with electrical power by the secondary power by means of the device (15) for rotary electrical connection.

7. A device according to claim 2, wherein at least one secondary installed electrical load comprises an electrical power supply circuit (71) comprising a rectifier for the secondary power in order to provide a continuous supply voltage.

8. A device according to claim 2, further comprising at least one detector arranged to provide a signal that is representative of at least one parameter of an electric current flowing in the secondary circuit, so as to allow this parameter to be monitored.

9. A device according to claim 1, wherein each stator coupling device comprises a filter that isolates each secondary source from the main power.

10. A device according to claim 1, wherein said secondary circuit comprises:

at least one electrical conductor, named the secondary conductor (34) of the rotor, which is rigidly connected to the rotor, at least one device, named a rotor coupling device, for electrically coupling each secondary conductor (34) of the rotor to at least one main conductor of the rotor, named the mixed conductor of the rotor, the rotor coupling device being suitable for selectively supplying each secondary conductor (34) of the rotor with secondary power provided by each mixed conductor of the rotor, at least one secondary conductor (34) of the rotor being connected to at least one secondary installed electrical load that is thus supplied with electrical power by the secondary power by means of the device (15) for rotary electrical connection.

11. A device according to claim 10, wherein each rotor coupling device comprises a filter that isolates each secondary installed electrical load from the main power.

12. A device according to claim 10, wherein at least one secondary installed electrical load comprises an electrical power supply circuit (71) comprising a rectifier for the secondary power in order to provide a continuous supply voltage.

13. A device according to claim 1, further comprising at least one detector arranged to provide a signal that is representative of at least one parameter of an electric current flowing in the secondary circuit, so as to allow this parameter to be monitored.

14. A device according to claim 1, wherein each electrical-coupling device comprises an isolating transformer that forms an inductive coupling.

15. A device according to claim 1, wherein, with said rotor (12) comprising at least one blade (24), at least one secondary installed electrical load comprises a circuit, named a tertiary circuit, comprising:

at least one device for electrically coupling the rotor coupling device to an electrical conductor, named the tertiary conductor (40) of the rotor, which is suitable for supplying the tertiary conductor of the rotor with electric current provided by the rotor coupling device, at least one device for electrically coupling the tertiary conductor (40) of the rotor to an electrical loop circuit supported by a blade (24) of the rotor, at least one device for electrically coupling the electrical loop circuit to a unit for supplying electrical power to at least one electrical load, named the tertiary electrical load, which is supported by said blade of the rotor.

16. A device according to claim 1, wherein, with the main circuit comprising at least one switch between the main source and the main conductors of the stator, each stator coupling device is linked to a main conductor of the stator that is directly connected to the device for rotary electrical connection, without a switch therebetween.

17. A turbomachine comprising a rotor (12) that is mounted so as to rotate relative to a stator (11), at least one main electrical load installed on the rotor and at least one secondary electrical load installed on the rotor, wherein the turbomachine comprises a device for separately transmitting multiple electrical powers on the rotor according to claim 1.

18. A turbomachine according to claim 17, wherein the rotor (12) comprises at least one propeller having a plurality of blades (24) that are mounted for conjoint rotation with the rotor, and, as a main electrical load, a device (16) for de-icing at least one blade of the propeller, and in that at least one secondary installed electrical load is selected from the group of electrical transducers and electrical actuators.

19. An aircraft comprising at least one turbomachine according to claim 17.

20. A wind turbine comprising at least one turbomachine according to claim 17.

* * * * *